United States Patent [19]
Brakke

[11] Patent Number: 5,372,546
[45] Date of Patent: Dec. 13, 1994

[54] GRAB ROLLER CLEANER FOR SUGAR BEET HARVESTOR AND CONVEYOR SYSTEMS

[76] Inventor: Henry D. Brakke, 5060 - 173rd Ave. S.E., Hickson, N. Dak. 58047

[21] Appl. No.: 44,748
[22] Filed: Apr. 12, 1993
[51] Int. Cl.⁵ .............................................. A01F 11/00
[52] U.S. Cl. ..................... 460/103; 460/132; 171/58
[58] Field of Search ............... 460/132, 103, 104, 904, 460/98; 171/58, 10, 25, DIG. 1; 15/3.1, 3.11

[56] References Cited
U.S. PATENT DOCUMENTS

| | | |
|---|---|---|
| 792,776 | 6/1905 | Kavanaugh . |
| 1,334,841 | 3/1920 | Cooley . |
| 2,604,206 | 7/1952 | Armer . |
| 3,399,766 | 9/1968 | Rollins . |
| 3,750,211 | 8/1973 | Zaun et al. ............ 15/3.11 |
| 3,855,761 | 12/1974 | Louks et al. ........ 171/58 X |
| 4,049,058 | 9/1977 | Eisenhardt et al. ....... 171/58 |
| 4,974,406 | 12/1990 | Russ ....................... 56/351 |
| 5,274,989 | 1/1994 | Ng ................... 56/400.11 X |

OTHER PUBLICATIONS

Heath Farm Equipment Brochure, Hydraulic Six-Row Direct Beet Harvester (prior to May 12, 1986).

*Primary Examiner*—Terry Lee Melius
*Attorney, Agent, or Firm*—Burd, Bartz & Gutenkauf

[57] ABSTRACT

A sugar beet harvestor having a grab roller assembly is equipped with a cleaner for removing mud and debris from the rollers of the grab roller assembly. The cleaner has a pair of rails that movably support a traveler. Downwardly directed blades attached to the traveler have lower ends located in close proximity to the rollers of the grab roller assembly. A reversible power driven drive operates to reciprocate the traveler along the rails thereby moving the blades relative to the outer surfaces of the rollers so that mud and debris on the rollers are removed therefrom.

21 Claims, 6 Drawing Sheets

GRAB ROLLER CLEANER FOR SUGAR BEET HARVESTOR AND CONVEYOR SYSTEMS

FIELD OF INVENTION

The invention is in the field of root crop harvesting machines having structures for separating soil and debris from the root crop. More particularly, the invention is directed to a sugar beet harvestor having grab rollers that separate soil and debris from sugar beets and a cleaner for removing soil and debris from the grab rollers.

BACKGROUND OF INVENTION

Root crop harvestors are used to lift, clean and load sugar beets onto transport vehicles. The harvestors have beet lifting wheels that lift the beets from the soil along with a considerable amount of soil which must be separated from the beets. Under wet soil conditions, the soil will stick and build up on the grab roller assembly causing considerable strain on the parts of the harvestor as well as substantially increasing the power requirements to operate the harvestor. The harvestor must be periodically shut down to clean the mud and soil from the grab roller assembly to provide for an efficient and effective operation of the harvestor. Examples of sugar beet harvestors having grab roller assemblies are shown by E. C. Rollins in U.S. Pat. No. 3,399,766 and F. W. Eisenhardt in U.S. Pat. No. 4,049,058.

SUMMARY OF INVENTION

The invention relates to a grab roller cleaner used with a root crop harvestor, such as a sugar beet harvestor having a plurality of power driven grab rollers. The cleaner has a frame that is mounted on the harvestor adjacent and above the grab rollers. A plurality of longitudinal rails are secured to the frame and extend generally parallel to and above the rollers. A traveler is movably mounted on the rails for movement along the rails. The traveler supports downwardly directed blades that have end portions located adjacent the outer surfaces of the rollers so that on rotation of the rollers and movement of the traveler in a direction generally parallel to the rollers, the soil and other material that has accumulated on the rollers is removed.

The preferred embodiment of the grab roller cleaner has a generally rectangular frame including side members located generally parallel to the rollers and laterally thereof and end members that are secured to opposite ends of the side members. A pair of rails comprising tubular members having outer cylindrical surfaces extend between and are mounted on the end members generally parallel and above the rollers. A traveler is movably mounted on the rails for movement along the length of the rails. The traveler included sleeves that telescope about the cylindrical surfaces of the rails and a cross member that is secured to the sleeves. Downwardly directed blades are secured to the cross member with holders. The blades have lower ends that are located in close proximity to the cylindrical surfaces of the rollers. Holders mount the blades on the cross members. The holders have adjusting structures that allow the blades to be vertically adjusted whereby the ends of the blades can be adjusted in close proximity to the cylindrical surfaces of the rollers. The holders are also laterally adjustable relative to the cross member so that the position of the blades can be adjusted to accommodate different types of grab roller assemblies. A chain and sprocket drive is used to move the traveler along the length of the rails. A motor, such as a hydraulic motor, is used to apply power to the chain and sprocket drive thereby moving the transverse traveler along the rails and blades along the length of the rollers whereby soil and debris on the rollers is removed from the rollers. An operator controlled valve is used to operate the motor so that the operator can periodically clean the rollers of the grab roller assembly in the field during the operation of the harvestor.

DESCRIPTION OF PREFERRED EMBODIMENT

Figure 1:
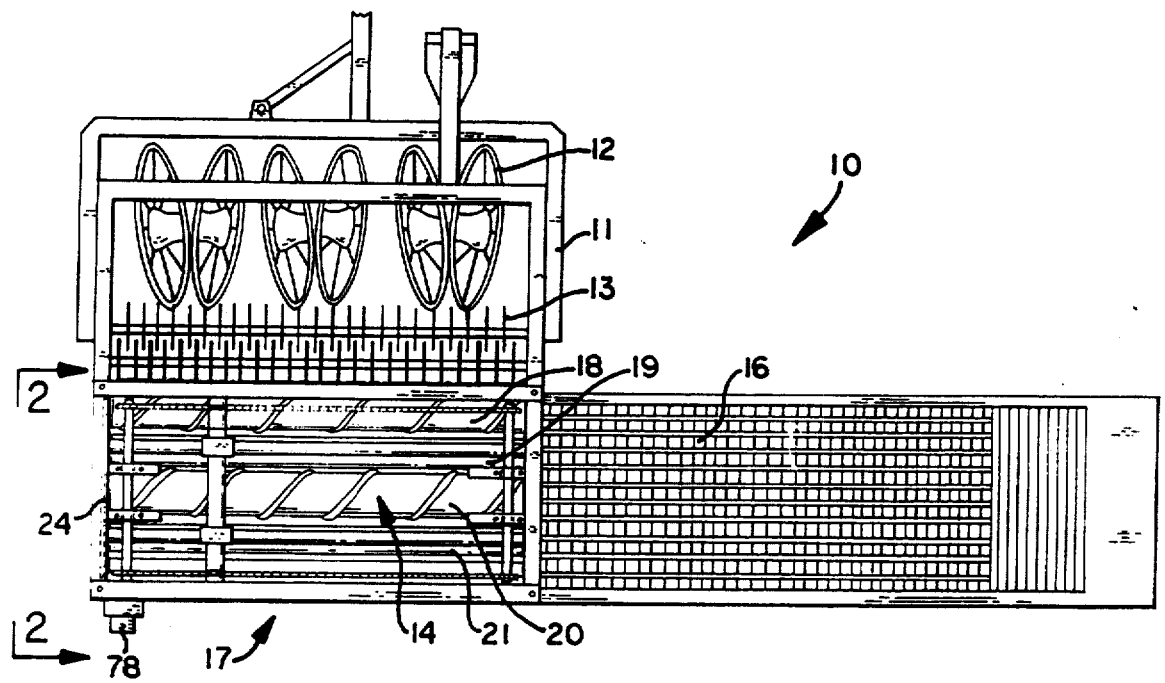
FIG. 1 is a fragmentary plan view of a root crop harvestor equipped with the cleaner of the invention for the grab roller assembly.

Referring to FIG. 1, there is shown a root crop harvestor indicated generally at 10 used to lift, clean and load sugar beets. Harvestor 10 is known as a beet harvestor having a generally rectangular frame 11 for supporting a plurality of beet lifting wheel units 12. Lifting wheel units 12 are conventional beet lifting wheels comprising a pair of rearwardly converging discs rotatably mounted on a support connected to a portion of the frame. The discs penetrate the soil and rotate on forward movement of the harvester to lift the beets out of the soil. The beets are deposited on rienks 13 which function to separate soil from the beets and move the beets rearwardly onto a grab roller assembly indicated generally at 14. Grab roller assembly 14 further cleans the soil and other material from the beets and delivers the beets to a loading conveyer 16. Conveyer 16 operates to move the beets upwardly and laterally whereby the beets can be dumped into a transport vehicle, as a box of a truck or trailer, moving with harvestor 10. Harvestor 10 is connected to a tractor (not shown) which, in addition to pulling the harvestor, supplies hydraulic fluid under pressure to the hydraulic motors used to drive the grab roller assembly and loading conveyer 16. Mechanical gear and shaft drives can be used to power the grab roller assembly 14 and loading conveyer 16. Examples of beet harvestors are shown by E. C. Rollins in U.S. Pat. No. 3,399,766 and F. W. Eisenhardt in U.S. Pat. No. 4,049,058. Other types of root crop harvesters can be used with the cleaner indicated generally at 17 for grab roller assembly 14.

In lifting beets on heavy soils and wet soils, mud builds up on the grab roller assembly causing considerable strain on the parts of the harvestor with a substantial increase in the power requirements to operate the harvestor. Cleaner 17 is used to periodically remove the mud from the grab roller assembly to increase its cleaning efficiency and lowers the power requirements to operate the harvestor.

Figure 2:
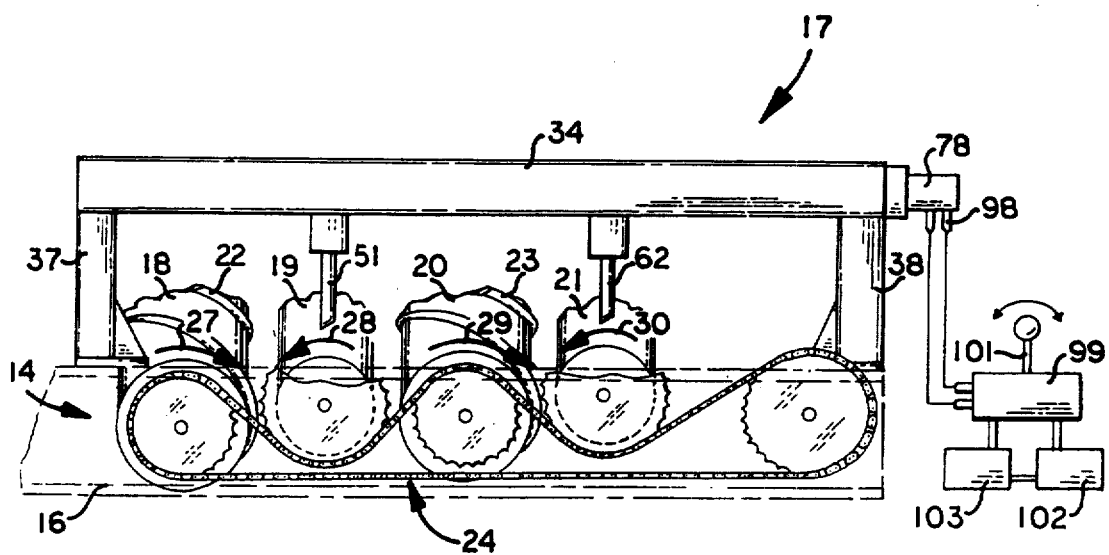
FIG. 2 is an enlarged end view of the harvestor of FIG. 1 showing the chain and sprocket drive for the grab roller assembly.

As shown in FIGS. 1 and 2, grab roller assembly 14 has four linear rollers 18, 19, 20 and 21 rotatably mounted on the frame in parallel relation to each other rearwardly of links 13. Rollers 18 and 20 have spiral ribs 22 and 23 along the length thereof. Rollers 19 and 21 have smooth outer cylindrical surfaces throughout their length. A chain and sprocket drive indicated generally at 24 rotates rollers 18–21 about their respective longitudinal axis. The chain and sprocket drive is connected to a hydraulic motor 26 that operates to rotate the rollers at a selected speed in the direction of the arrows 27–30, as indicated in FIG. 2.

Figure 3:
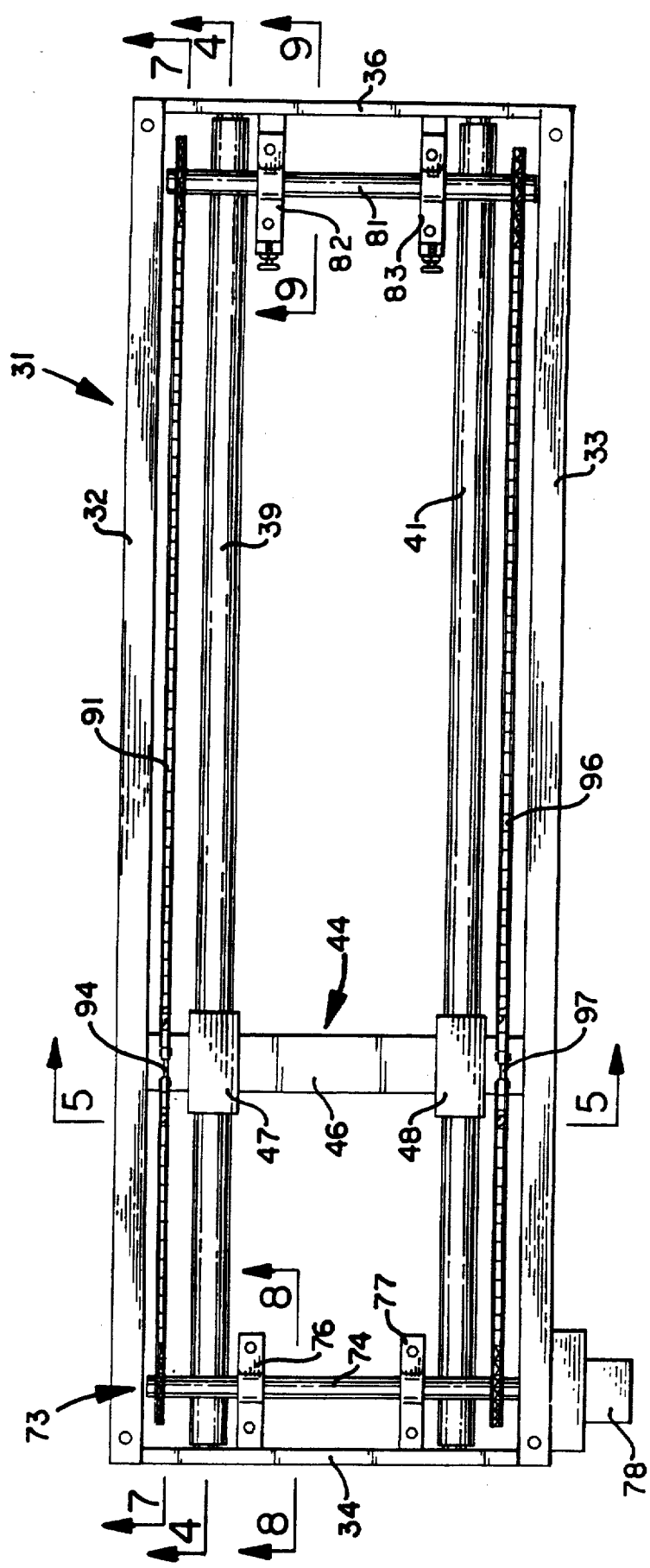
FIG. 3 is an enlarged top plan view of the cleaner for the grab roller assembly.

As shown in FIG. 3, cleaner 17 has a generally rectangular frame 31 comprising side beams 32 and 33 connected at their opposite ends at cross plates or end members 34 and 36. A plurality of upright posts 37 and 38, as shown in FIG. 2, super impose frame 31 on top of frame 11 over grab roller assembly 14. The longitudinal lengths of side beams 32 and 33 can be adjusted to accommodate different length grab roller assemblies.

Figure 4:
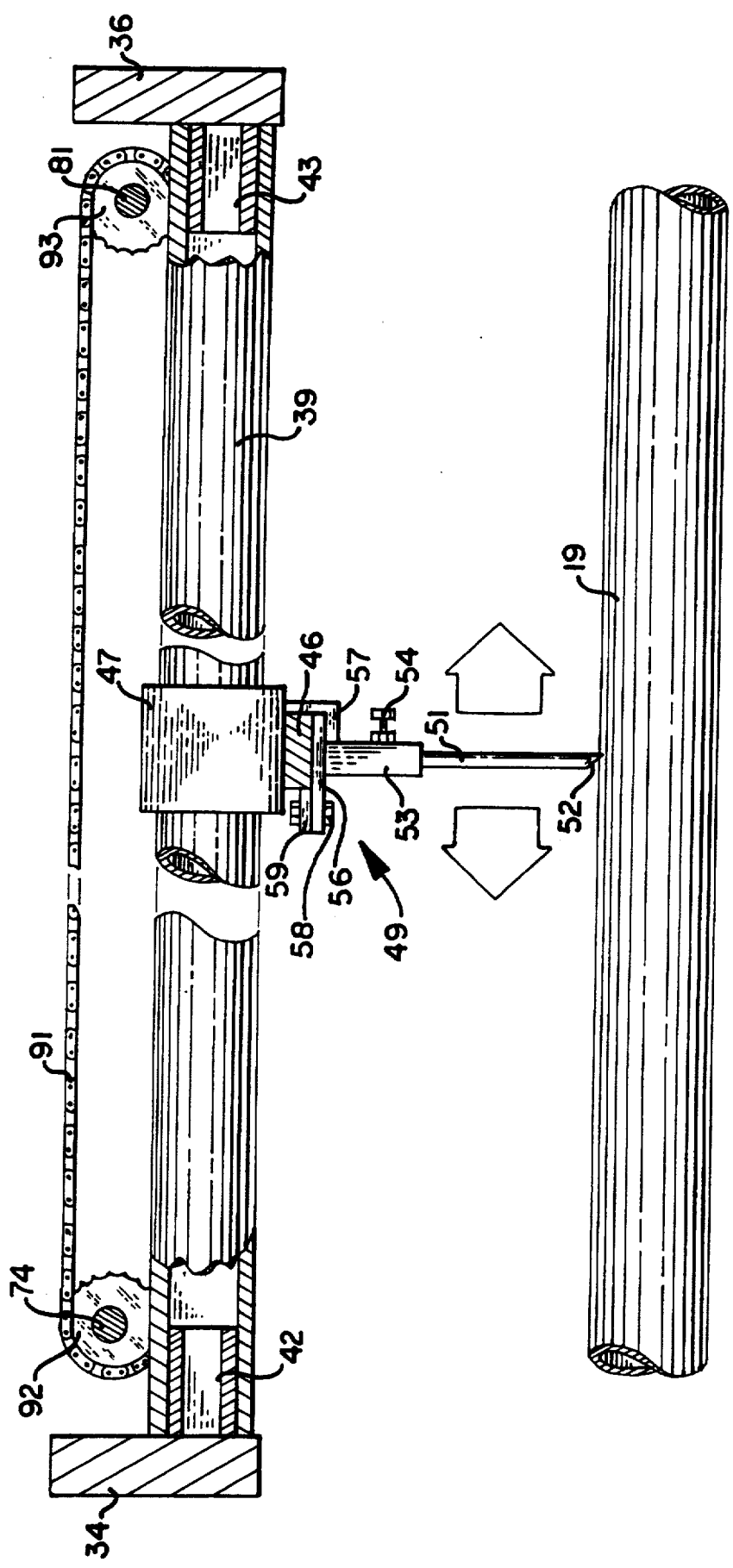
FIG. 4 is a fragmentary sectional view taken along the line 4—4 of FIG. 3.

A pair of longitudinal rails 39 and 41 are located above rollers 19 and 21. Opposite ends of rails 39 and 41 are mounted on end plates 34 and 36 respectively. As seen in FIG. 4, a boss 42 secured to end plate 34 telescopes into an end of rail 39. The opposite end of rail 39 telescopes into a boss 43 secured to end plate 36. Rail 41 is attached to end plates 34 and 36 in the same manner. Rails 39 and 41 are elongated cylindrical tubular members having smooth cylindrical outer surfaces that support a movable traveler indicated generally at 44. Traveler 44 has a cross member or plate 46 connected to sleeves 47 and 48 with welds or the like. Sleeves 47 and 48 are slideably mounted on rails 39 and 41 respectively for movement relative to the length of the rails over grab roller assembly 14.

A first blade assembly indicated generally at 49 is mounted on cross member 46 below sleeve 47. As seen in FIG. 4, knife assembly 49 has a downwardly directed blade 51 having a lower end 52 located in contiguous relationship relative to the outer cylindrical surface of roller 19. The upper end of blade 51 is located within a holder 53 and attached thereto with a fastener 54. Fastener 54 is a set bolt screw that secures blade 51 to holder 53. The upper end of holder 53 is attached to a plate 56 located in engagement with the bottom of cross member 46. A lip 57 extends over one edge of plate 56. The opposite edge of plate 56 is located below a flange 57 secured to plate 46. A bolt 58 attaches plate 56 to flange 59. Fastener 54 allows for vertical adjustment of blade 51 relative to roller 19. Lip 57 and bolt 58 allow knife assembly 49 to be laterally positioned on plate 46 to accommodate different types of grab roller assemblies. Flange 59 is provided with a plurality of laterally spaced apart holes to allow for lateral adjustment of knife assembly 49 relative to cross member 46.

Figure 5:
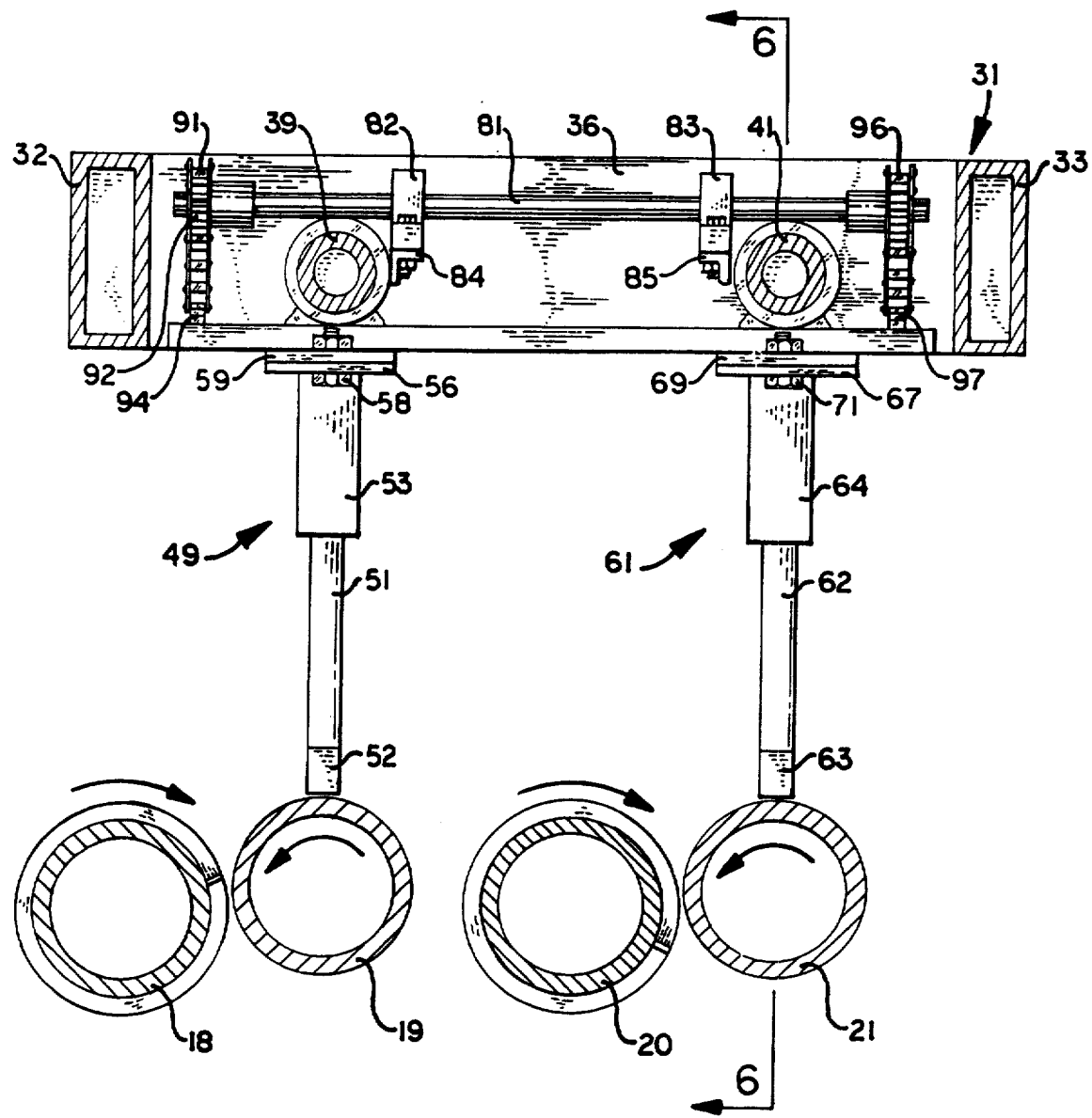
FIG. 5 is a sectional view taken along the line 5—5 of FIG. 3.
Figure 6:
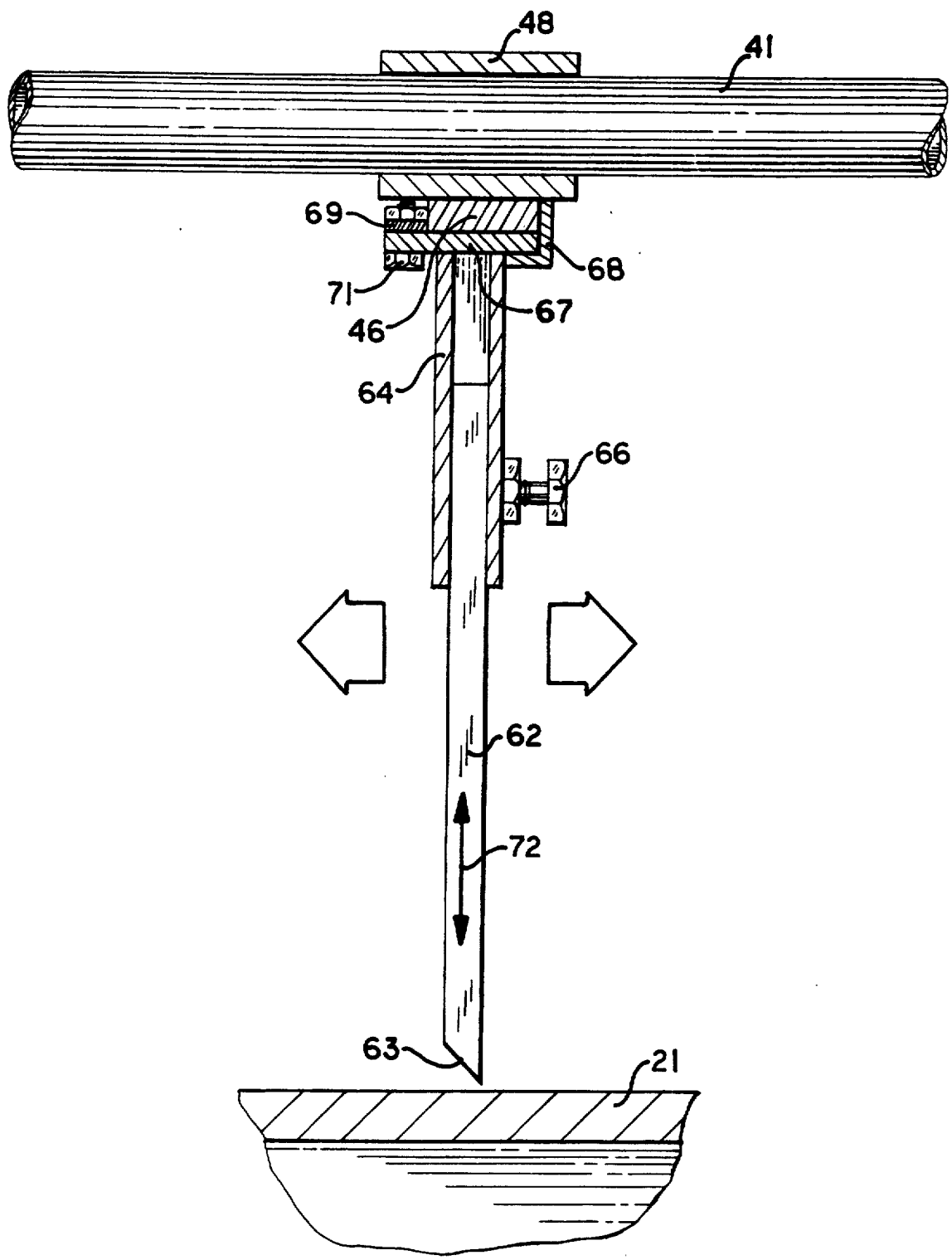
FIG. 6 is an enlarged sectional view taken along the line 6—6 of FIG. 5.

A second blade assembly indicated generally at 61, shown in FIGS. 5 and 6, is mounted on cross member 46 generally below sleeve 48. Knife assembly 61 has a downwardly directed blade 62 having a lower end 63 located in contiguous or close relationship relative to the outer surface of roller 21 of grab roller assembly 14. The upper end of blade 62 extended into a holder 64 is attached thereto with a fastener 66. Fastener 66 is a set bolt that clamps blade 62 onto holder 64. Fastener 66 can be released to allow for vertical adjustment of blade 62 as indicated by the arrow 72 relative to the outer surface of roller 21. The upper end of holder 64 is attached to a plate 67 located below cross member 46. One edge of plate 67 extends under a lip 68 secured to cross member 46. The opposite edge of plate 67 is located under a flange 69 secured to cross member 46. A bolt 71 secures plate 67 to flange 69. The lip and flange structure allows knife assembly 61 to be laterally adjusted on cross member 46 to accommodate different types and sizes of grab roller assemblies.

Figure 8:
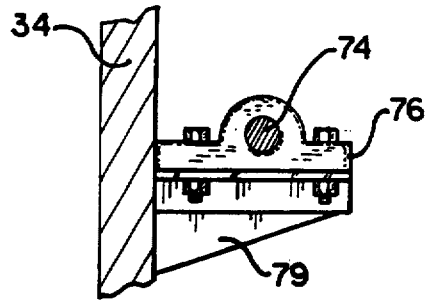
FIG. 8 is an enlarged sectional view taken along the line 8—8 of FIG. 3.

A drive apparatus indicated generally at 73 operates to reciprocate traveler 44 along rails 39 and 41, thereby moving the blades 51 and 62 along the length of grab rollers 19 and 21. The rotating grab rollers carry the mud and debris into engagement with the lower ends 52 and 63 of blades 51 and 52 so as to remove the mud and debris from the outer surfaces of rollers 19 and 21. Drive apparatus 73 has a first drive shaft 74 rotatably mounted on bearing assemblies 76 and 77 secured to end plate 34. As seen in FIG. 8, bracket 79 attached to plate 34 supports bearing 76. A similar bracket (not shown) supports bearing 77 on plate 34. A hydraulic motor 78 mounted on side beam 33 is driveably connected to shaft 77 and operates to rotate the shaft 74.

Figure 9:
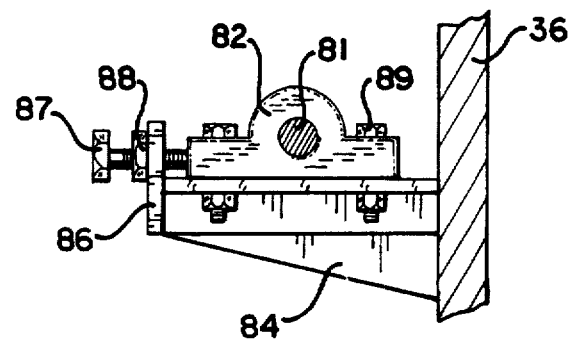
FIG. 9 is an enlarged sectional view taken along the line 9—9 of FIG. 3.

A second shaft 81 is rotatably mounted on bearing assemblies 82 and 83 attached to end plate 36. As seen in FIG. 9, bracket 84 attached to plate 36 supports bearing 82. A similar bracket (not shown) supports bearing 83 on end plate 36. Bracket 84 has an upwardly directed ear 86 accommodating a bolt 87 threaded through a nut 88. The bolt has a forward end that engages the bearing assembly 82 to adjust the position of the bearing assembly on bracket 84. A plurality of bolts 89 secure bearing assembly 82 to the top of bracket 84 in its adjusted position. Bearing assembly 83 has the same adjusting structure as shown in FIG. 9. The adjusting structure of the bearing assemblies 82 and 83 are used to maintain tension on a pair of chains 91 and 96 operatively connected to opposite ends of the shafts 74 and 81.

Figure 7:
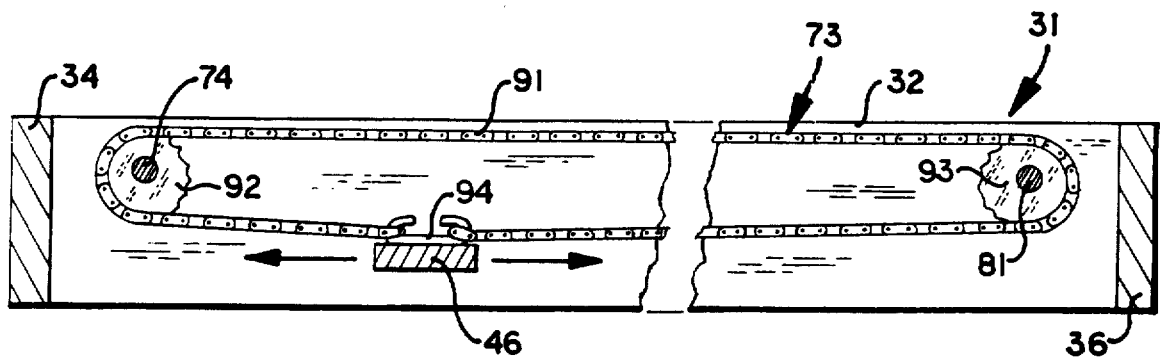
FIG. 7 is a fragmentary sectional view taken along the line 7—7 of FIG. 3.

As seen in FIG. 7, a link chain 91 is trained about sprockets 92 and 93 and attached to shaft 74 and 81 respectively. Chain 91 is joined to a connector 94 attached to cross member 46. As shown in FIG. 3, a chain and sprockets 96 are operatively connected to shaft 74 and 81. A connector 97 attaches chain 96 to cross member 46.

Returning to FIG. 2, lines or hoses 98 connected to motor 78 lead to a valve 99 having an actuating lever 101. Valve 99 receives hydraulic fluid under pressure from a pump 102 and discharges hydraulic fluid to a reservoir or tank 103. Valve 99 is operable to regulate the flow of hydraulic fluid pressure to the motor 78 to selectively operate the motor for driving shaft 74 in opposite directions. The shaft 74 will rotate the sprockets attached thereto and thereby move chains 91 and 96. This causes the traveler 44 to move along rails 39 and 41. The lower ends 52 and 63 of knives 51 and 62, respectively being located in contiguous relationship relative to the outer surfaces of the rollers 19 and 21, scrape off the mud, dirt and debris that is carried by the rollers as they move along the length of the rollers.

In use, lifting wheel units 12 pull the sugar beets out of the ground. The beets are deposited on the rienks 13 which deliver the beets to grab roller assembly 14. The rollers 18–21 are driven at relatively high speeds and function to remove soil from the beets and pull the soil through the rollers and onto the ground under harvestor 10. The beets move along the grab roller assembly and are deposited on the elevator or loading conveyor 16 for delivery to a container such as a truck or trailer box. When harvestor 10 is used on heavy soils mud and soil build up on grab rollers 18-21 causing a build up of excessive strains and forces on the grab roller assembly and an increase in the power requirements to operate harvester 10. Rollers 19 and 21 are cleaned by pushing lever 101 to supply hydraulic fluid under pressure to the motor 78. The motor, through chains 91 and 96, move traveler 44 and thereby move blades 51 and 62 relative to rollers 19 and 21. This removes the mud and debris from the rollers. Valve 99 is mounted on the tractor that operates harvestor 10. Hydraulic fluid under pressure can be supplied by the pump incorporated in the tractor. Traveler 44 is moved along the length of rails 39 and 41 from a position adjacent the end member 34 to the end member 36 and back to the end member 34. Traveler 44 is parked adjacent end member 34 during the operation of harvestor 10.

While there have been shown and described an embodiment of the cleaner for a beet harvestor, it is understood that changes in the structure may be made by those skilled in the art without departing from the invention. The cleaner can also be used with other root crop harvesting machines. The invention is defined in the following claims.

I claim:

1. A grab roller cleaner for use with a root crop harvestor having a plurality of power driven grab rollers comprising: a frame located above the grab rollers, a plurality of longitudinal rail means secured to the frame extended generally parallel to the rollers and located above the rollers, traveler means movably mounted on the rail means for movement along said rail means, means secured to the traveler means located adjacent at least one of the rollers to remove material including soil from the one of the rollers, and means operably connected to the traveler means and frame for moving the traveler means along said rail means whereby the means secured to the traveler means removes material including soil from said one of the rollers.

2. The cleaner of claim 1 wherein:
said frame includes end members and longitudinal side beams secured to the end members, said rail means comprise a pair of rails extended generally parallel to the side beams, and means connecting the rails to the end members.

3. The cleaner of claim 2 wherein:
the rails are longitudinal cylindrical members.

4. The cleaner of claim 3 wherein:
said traveler means includes sleeve means slidably mounted on the cylindrical members and a cross member secured to the sleeve means, said means for moving the traveler means along said rail means being connected to said cross member.

5. The cleaner of claim 4 wherein:
said means secured to the traveler means includes blade means having lower ends located adjacent the one of the rollers, holder means for the blade means connected to the cross member, and means mounting the blade means on the holder means.

6. The cleaner of claim 5 including:
means for adjusting the vertical position of the blade means on the holder means to adjust the location of the lower ends of the blade means relative to the one of the rollers.

7. The cleaner of claim 5 including:
connector means mounting the holder means on the cross member, said connector means being adjustable along the cross member to align the blade means with the one of the rollers.

8. The cleaner means of claim 4 wherein:
the means operably connected to the traveler means for moving the traveler means along said rail means includes chain means connected to the cross member, a first transverse shaft located adjacent one end member of the frame, means journaling the first shaft to said one end member, first sprocket means secured to said first transverse shaft accommodating said chain means, a second transverse shaft located adjacent the other end member of the frame, means journaling the second shaft to said other end member, second sprocket means secured to said second transverse shaft accommodating said chain means, and motor means connected to one of said shafts operable to selectively rotate said one of said shafts thereby moving said traveler means along said rail means in opposite directions whereby the blade means removes material including soil from said one of the rollers.

9. The cleaner of claim 1 wherein:
said means secured to the traveler means includes blade means having lower ends located adjacent the rollers, holder means for the blade means connected to the traveler means, and means mounting the blade means on the holder means.

10. The cleaner of claim 9 wherein:
the means mounting the blade means on the holder means includes means for adjusting the vertical position of the blade means to adjust the locations of the lower ends of the one of the blade means relative to the rollers.

11. The cleaner of claim 9 including:
connector means mounting the holder means on the traveler means, said connector means including laterally adjustable means to align the blade means with the one of the rollers.

12. The cleaner of claim 1 wherein:
the means operably connected to the traveler means includes chain means connected to the traveler means, a first transverse shaft located adjacent one end of the rail means, means journaling the first shaft to said frame, first sprocket means secured to said first transverse shaft accommodating said chain means, a second transverse shaft located adjacent the other end of the rail means, means journaling the second shaft to said frame, second sprocket means secured to said second transverse shaft accommodating said chain means, and motor means connected to one of said shafts operable to selectively rotate said one of said shafts thereby moving said traveler means along said rail means in opposite directions whereby the blade means removes material including soil from said one of the rollers.

13. A grab roller cleaner for use with a root crop harvestor having a plurality of rotatable grab rollers including rollers having cylindrical outer surfaces, and drive means for rotating the grab rollers comprising: a frame having end members located generally above said rollers and adjacent opposite ends of the rollers, rail means extending between said end members generally parallel to said rollers, means mounting the rail means on said end members, traveler means movably mounted on the rail means for movement along said rail means, blade means mounted on the traveler means for removing material from the cylindrical outer surfaces of the rollers, and means operably connected to the traveler means and frame for moving the traveler means along the rail means whereby the blade means moves relative to the length of the cylindrical outer surfaces of the rollers to remove material therefrom.

14. The cleaner of claim 13 wherein:
the frame has side members extended generally parallel to the rollers, said end members being secured to the side members, and means for mounting the frame on the harvestor.

15. The cleaner of claim 13 wherein:
the rail means are elongated cylindrical members located above and generally parallel to the grab rollers.

16. The cleaner of claim 15 wherein:
the traveler includes sleeve means slidably mounted on the cylindrical members and a cross member secured to the sleeve means, and means connecting the means for moving the traveler means to the cross member.

17. The cleaner of claim 15 wherein:
the means operably connected to the traveler means for moving the traveler means along said rail means includes chain means connected to the cross member, a first transverse shaft located adjacent one end member of the frame, means journaling the first shaft to said one end member, first sprocket means secured to said first transverse shaft accommodating said chain means, a second transverse shaft located adjacent the other end member of the frame, means journaling the second shaft to said other end member, second sprocket means secured to said second transverse shaft accommodating said chain means, and second transverse shaft located adjacent the other end member of the frame, means journaling the second shaft to said other end member, second sprocket means secured to said second transverse shaft accommodating said chain means, and motor means connected to one of said shafts operably to selectively rotate said one of said shafts thereby moving said traveler means along said rail means in opposite directions whereby the blade means removes material including soil from said grab rollers.

18. The cleaner of claim 15 including:
holder means for the blade means mounted on the cross member.

19. The cleaner of claim 18 including:
means for adjusting the vertical positions of the blade means on the holder means to adjust the location of the lower ends of the blade means relative to the rollers.

20. The cleaner of claim 18 including:
connector means mounting the holder means on the cross member, said connector means being adjustable along the cross member to align the blade means with the rollers.

21. The cleaner of claim 13 including:
holder means for the blade means mounted on the traveler means, said holder means including means for adjusting the vertical positions of the blade means on the holder means to adjust the location of the blade means relative to the cylindrical surfaces of the rollers, and connector means mounting the holder means on the traveler means, said connector means being laterally adjustable to align the blade means with the rollers.

* * * * *